(12) United States Patent
Umehara

(10) Patent No.: US 10,791,572 B2
(45) Date of Patent: Sep. 29, 2020

(54) COMMUNICATION APPARATUS THAT PERMITS HIGH FREQUENCY UTILIZATION EFFICIENCY WHILE REDUCING INTERFERENCE, CONTROL METHOD, AND STORAGE MEDIUM

(71) Applicant: CANON KABUSHIKI KAISHA, Tokyo (JP)

(72) Inventor: Makoto Umehara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 15/690,347

(22) Filed: Aug. 30, 2017

(65) Prior Publication Data

US 2018/0084584 A1    Mar. 22, 2018

(30) Foreign Application Priority Data

Sep. 20, 2016    (JP) ................... 2016-183360

(51) Int. Cl.
| | | |
|---|---|---|
| *H04W 72/04* | (2009.01) | |
| *H04W 74/08* | (2009.01) | |
| *H04W 72/12* | (2009.01) | |
| *H04W 84/12* | (2009.01) | |
| *H04W 88/02* | (2009.01) | |

(52) U.S. Cl.
CPC ..... *H04W 74/0816* (2013.01); *H04W 72/121* (2013.01); *H04W 84/12* (2013.01); *H04W 88/02* (2013.01)

(58) Field of Classification Search
CPC ........... H04W 74/0816; H04W 72/121; H04W 88/02; H04W 84/12
See application file for complete search history.

(56) References Cited

U.S. PATENT DOCUMENTS

| | | | | |
|---|---|---|---|---|
| 2017/0006541 | A1* | 1/2017 | Huang | H04W 48/20 |
| 2017/0142659 | A1* | 5/2017 | Noh | H04W 52/0245 |
| 2017/0230964 | A1* | 8/2017 | Park | H04W 72/0413 |
| 2017/0295560 | A1* | 10/2017 | Kim | H04W 84/12 |
| 2018/0199375 | A1* | 7/2018 | Nezou | H04W 74/006 |

OTHER PUBLICATIONS

Huang et al., NAV Consideration for UL MU Response Follow Up, doc.: IEEE 802.11-15/1326r2, pp. 1-23, Nov. 9, 2015.

* cited by examiner

*Primary Examiner* — Hassan Kizou
*Assistant Examiner* — Mahbubul Bar Chowdhury
(74) *Attorney, Agent, or Firm* — Rossi, Kimms & McDowell LLP

(57) ABSTRACT

A communication apparatus, method of communication, and storage medium storing a computer program are provided. The communication apparatus selects, based on a first signal received from another apparatus that belongs to a BSS (Basic Service Set) complying with IEEE802.11 standard, a first or second mode. In the first mode, a first NAV (Network Allocation Vector) and a second NAV are maintained. In the second mode, one NAV is maintained. The first and second NAVs are updated based on signals received from another apparatus that does belongs to a first BSS, or does not belong to the first BSS, respectively. If the first mode is selected and the first NAV is not zero, the second NAV is zero, and a Trigger Frame (TF) complying with IEEE802.11ax standard is received, the communication apparatus responds to the TF. If the second NAV is not zero, the communication apparatus does not response to the TF.

11 Claims, 8 Drawing Sheets

COMMUNICATION APPARATUS THAT PERMITS HIGH FREQUENCY UTILIZATION EFFICIENCY WHILE REDUCING INTERFERENCE, CONTROL METHOD, AND STORAGE MEDIUM

BACKGROUND OF THE INVENTION

Field of the Invention

The present invention relates to techniques of controlling interference in wireless communication.

Description of the Related Art

Wireless communication functions, such as wireless LAN and the like, have in recent years been incorporated into a variety of electronic devices so that various services are available through wireless communication. Electronic devices having a wireless communication function are expected to increase further in future. The increase in electronic devices having a wireless communication function would lead to the expectation that wireless communication technologies having a higher frequency utilization efficiency than in the conventional art are required.

With the above background in mind, IEEE802.11ax is being studied as a next-generation wireless LAN standard that allows for the use of radio frequencies with high efficiency (HE). Here, an access point (AP) and a station (STA) conforming to IEEE802.11ax are called an HE AP and an HE STA, respectively. A basic service set (BSS) including an HE AP and HE STAs is called an HE BSS.

IEEE802.11ax specifies an uplink multi-user (UL MU) communication scheme in which a plurality of HE STAs simultaneously transmit a frame to an HE AP. In UL MU communication, the HE AP uses a request-to-send (RTS)/clear-to-send (CTS) procedure so that uplink frames transmitted by desired HE STAs are not interfered with by undesired waves. Note that a technique of allowing surrounding STAs to recognize the environment using RTS/CTS is also called virtual carrier sensing. In order to provide an uplink frame transmission opportunity to predetermined HE STAs, the HE AP transmits an RTS to surrounding wireless LAN communication apparatuses so that these communication apparatuses are not allowed to transmit a signal. Note that the HE AP may transmit CTS (e.g., CTS-to-self) instead of RTS. An HE STA, when receiving RTS from the HE AP, sets its network allocation vector (NAV). If an HE STA receives a basic trigger frame indicating that the HE STA itself is allowed to transmit a signal during the NAV period, the HE STA responds to this by transmitting an uplink signal. Note that, at that time, uplink signal transmission may be simultaneously performed by a plurality of HE STAs, i.e., UL MU communication may be performed. It is assumed that UL MU communication is performed using at least MU-MIMO or OFDMA. Note that MU-MIMO, which is an acronym for multi-user multi-input multi-output, is a technique for multiplexing a plurality of signals in the spatial domain. In MU-MIMO, the weighted addition of received signals using, for example, a plurality of antennas allows spatial separation of these signals, and therefore, a plurality of HE STAs transmit and receive a signal in parallel (simultaneously). OFDMA, which is an acronym for orthogonal frequency-division multiple access, is a technique for multiplexing a plurality of signals in the frequency domain. In OFDMA, a portion of many OFDM subcarriers are allocated to one HE STA, and another portion thereof are allocated to another HE STA, and therefore, a plurality of HE STAs transmit and receive a signal in parallel (simultaneously).

Note that the NAV is originally set so that an undesired wireless LAN communication apparatus is forbidden from transmitting a signal. That is to say, an HE STA does not transmit a signal during the NAV period, except for when the HE STA receives a basic trigger frame indicating that the HE STA itself is allowed to transmit a signal. Therefore, for example, when an HE STA receives RTS/CTS from an AP or STA that is different from the HE AP, which is the other end of communication, the HE STA does not subsequently receive a basic trigger frame indicating that the HE STA itself is allowed to transmit a signal, and therefore, does not transmit a signal.

Meanwhile, the HE AP may fail to receive RTS/CTS that can be received by an HE STA. In this case, the HE AP may transmit RTS/CTS to the HE STA even when the HE STA has set an NAV period on the basis of RTS/CTS transmitted from another AP or the like. In this situation, when the HE STA receives, after the HE AP's RTS/CTS, a basic trigger frame indicating that the HE STA itself is allowed to transmit a signal, the HE STA may transmit a signal even during the NAV period set on the basis of the RTS/CTS transmitted from the other AP or the like.

In contrast, in IEEE802.11-15/1326r2, a two-NAVs scheme is proposed that employs an NAV for an HE BSS to which an HE STA itself belongs to (called an "intra-BSS NAV"), and an NAV for another BSS (called an "inter-BSS NAV"). In this scheme, an HE STA does not transmit a frame during a period of time when the inter-BSS NAV is set, even if the HE STA receives an RTS/CTS frame and a trigger frame. As a result, the HE STA's interference with another BSS can be prevented or reduced.

In a situation where an inter-BSS NAV is frequently set in an HE STA in response to RTS/CTS from another BSS, the HE STA has reduced frame transmission opportunities, and therefore, it is not easy for the HE STA to obtain a desired throughput or a sufficient frequency utilization efficiency. In particular, when the other BSS is one that uses IEEE802.11b or the like (called a "legacy BSS"), the operation of the legacy BSS, which has a low frequency utilization efficiency, may hinder the operation of the HE BSS, likely leading to a reduction in the frequency utilization efficiency of the HE BSS.

SUMMARY OF THE INVENTION

The present invention provides a technique of ensuring a high frequency utilization efficiency in wireless communication while preventing or reducing interference with other apparatuses.

According to one aspect of the present invention, there is provided a communication apparatus comprising: a selection unit configured to select whether the communication apparatus is to operate in a first mode in which one of a first period set for a first group to which the communication apparatus belongs and a second period set for a second group to which the communication apparatus does not belong, is managed, or in a second mode in which both of the first period and the second period are managed; and a communication unit configured to perform communication during a period while the first period if the a managed period is the first period in a case where when the selection unit selects the first mode, and perform communication in a period that is during the first period excluding and not in the second period in a case where when the selection unit selects the second mode.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Network Configuration)

Figure 1:
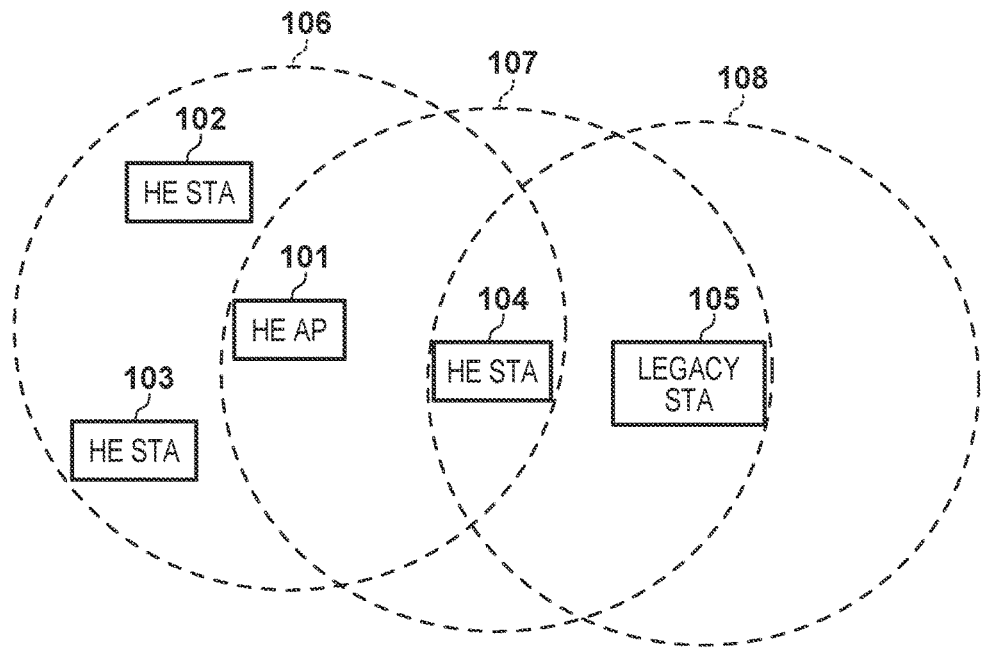
FIG. 1 is a diagram showing an example network configuration.

FIG. 1 shows an example network configuration according to this embodiment. The network includes an HE AP 101 and HE STAs 102-104 that are communication apparatuses conforming to IEEE802.11a/b/g/n/ac/ax. As described above, HE denotes high efficiency, AP denotes an access point, and STA denotes a station. The network also includes a legacy STA 105 that is a communication apparatus conforming to wireless LAN standards, such as IEEE802.11a/b/g/n/ac or the like, excluding IEEE802.11ax. The HE AP 101 and the HE STAs 102-104 are wirelessly coupled together to form an HE BSS. Note that BSS is an acronym for basic service set. The legacy STA 105 is wirelessly coupled to a legacy AP (not shown) to form a legacy BSS. It is assumed that the HE AP 101, the HE STA 104, and the legacy STA 105 have signal transmission coverage ranges 106, 107, and 108, respectively. As shown in FIG. 1, the HE STA 104 is within both of the ranges 106 and 108, and therefore, can receive signals transmitted from the HE AP 101 and the legacy STA 105. Meanwhile, the HE AP 101 cannot receive a signal transmitted from the legacy STA 105, and the legacy STA 105 cannot receive a signal transmitted from the HE AP 101.

Figure 2:
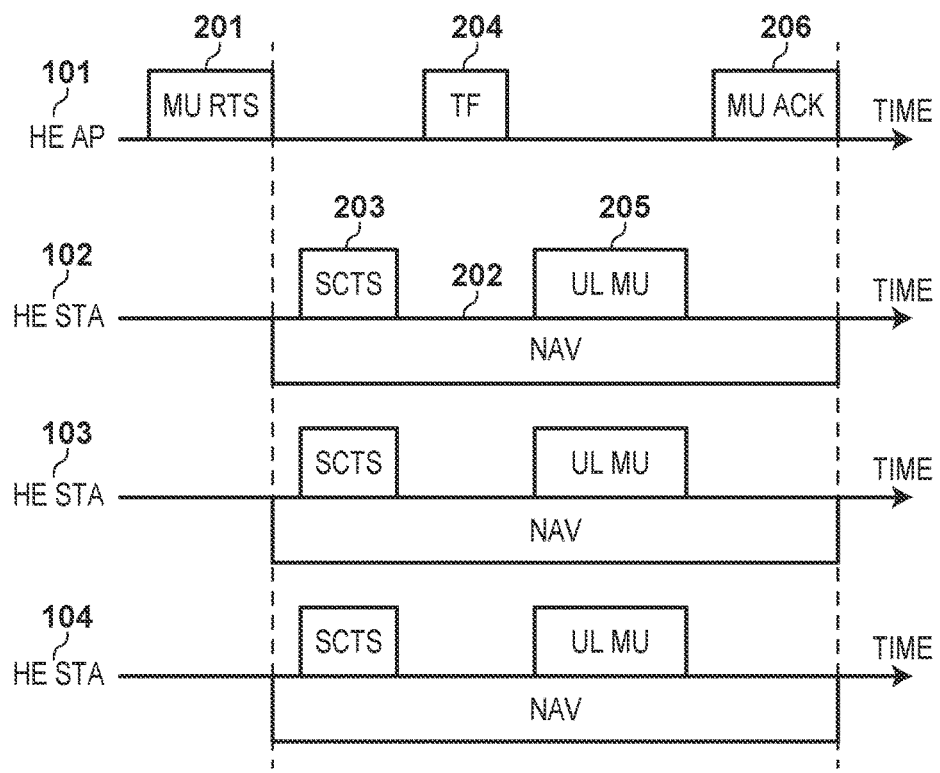
FIG. 2 is a diagram showing an example operation for uplink multi-user (UL MU) transmission.

Uplink multi-user (UL MU) communication that is performed between the HE AP 101 and the HE STAs 102-104 will now be described. FIG. 2 shows a flow of operation for UL MU communication conforming to the IEEE802.11ax standard. In the description that follows, a case where multi-user multiplexing is performed in the frequency domain using OFDMA is described. Instead of or in addition to this, multi-user multiplexing may be performed in the spatial domain using MIMO.

In UL MU communication conforming to IEEE802.11ax, the HE AP 101 transmits a trigger frame, and a designated HE STA receives the trigger frame, and in response to this, transmits an uplink signal. The trigger frame is newly defined in IEEE802.11ax. The HE STAs 102-104 confirm a value set in a Trigger Type field in the trigger frame. The HE STAs 102-104 are configured to identify, using the value, whether the received trigger frame is a multi-user RTS (MU RTS) frame or a basic trigger frame, and operate in accordance with the result of the identification.

Prior to UL MU communication, the HE AP 101 transmits an MU RTS frame 201 so that uplink frame transmission will not be interfered. The HE STAs 102-104, upon receiving the MU RTS frame 201, confirms a value set in the Duration/ID field of the frame. The HE STAs 102-104 set a network allocation vector (NAV) 202 on the basis of the confirmed value. The MU RTS frame also contains information about an HE STA that is requested by the HE AP 101 to transmit a simultaneous CTS (SCTS) frame 203. In response to the SCTS frame transmission request in the MU RTS frame, the HE STA transmits the SCTS frame 203. FIG. 2 shows an example in which the HE STAs 102-104 are designated, in the MU RTS frame 202, to transmit the SCTS frame 203, and in response to this, transmit the SCTS frame 203. Note that the SCTS frame 203 is also transmitted by the HE STAs in parallel (substantially simultaneously) in a format that allows the legacy STA 105 to demodulate the frame.

The HE AP 101, when receiving the SCTS frame 203 transmitted from each of the HE STAs 102-104, transmits a basic trigger frame 204 containing information about allocation of a resource unit (RU) (RU allocation information) to the HE STA. In OFDMA conforming to IEEE802.11ax, a channel band is divided into a plurality of RUs, which are then allocated to HE STAs in such a manner that signals transmitted from the HE STAs do not interfere with each other, so that signals for multiple users are multiplexed.

The HE STAs 102-104, when receiving the basic trigger frame 204, transmit an UL MU frame 205 on the basis of the RU allocation information. The UL MU frames transmitted from the HE STAs 102-104 are transmitted using different RUs and therefore do not interfere with each other. Therefore, the HE AP 101 can demodulate the UL MU frames with high accuracy. Actually, one UL MU frame may interfere with another UL MU frame at a certain level, depending on the performance of transmitters of the HE STAs 102-104, but the interference can be reduced to a sufficiently low level by the RU allocation. The HE AP 101, when normally receiving the UL MU frames, transmit multi-user acknowledgement (MU ACK) to the HE STAs 102-104. Thus, the UL MU communication is completed.

(Apparatus Configuration)

Next, a configuration of the HE STAs 102-104 according to this embodiment will be described. Note that the HE AP 101 has the same functions that are specified for conventional HE APs, and therefore, will not be described herein.

Figure 3:
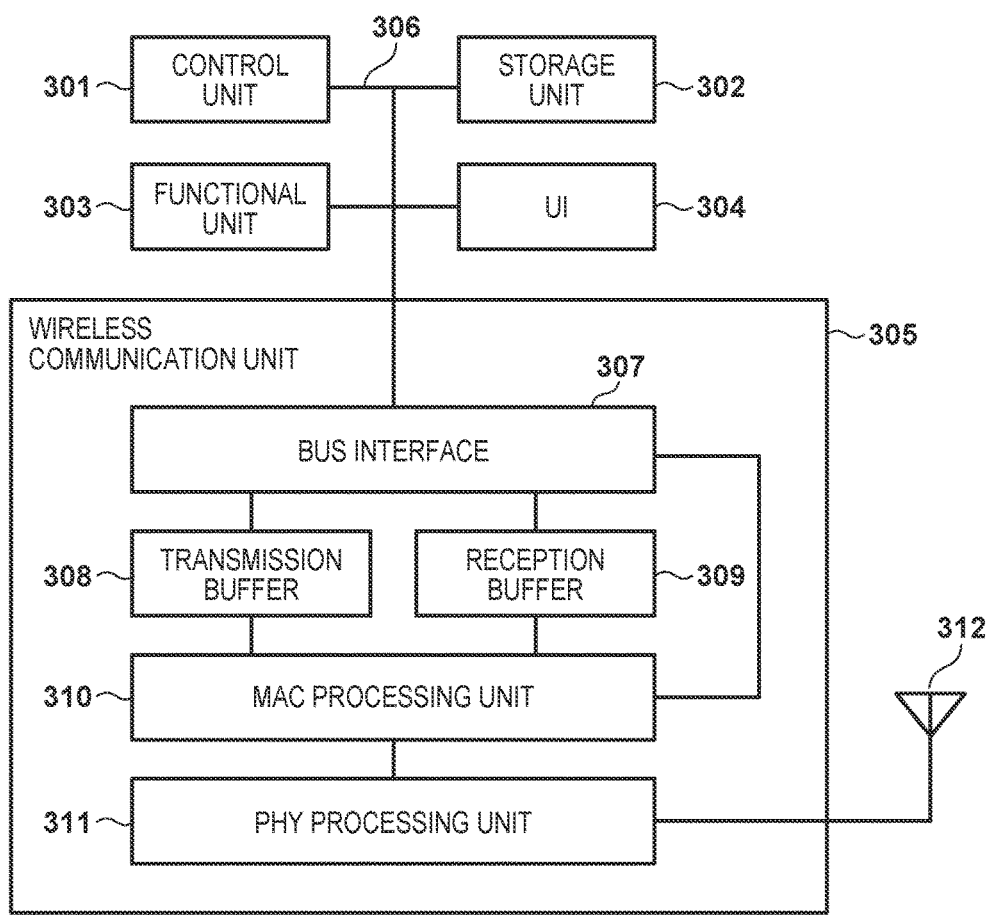
FIG. 3 is a diagram showing an example configuration of HE STAs 102-104.

FIG. 3 shows an example configuration of the HE STAs 102-104. As shown in FIG. 3, for example, the HE STAs 102-104 each include a control unit 301, a storage unit 302, a functional unit 303, a user interface (UI) 304, and a wireless communication unit 305. The control unit 301, the storage unit 302, the functional unit 303, the user interface (UI) 304, and the wireless communication unit 305 are coupled together through a bus interface 306.

The control unit 301 includes, for example, a processor, such as a CPU, MPU, or the like, an application-specific integrated circuit (ASIC), a digital signal processor (DSP), a field-programmable gate array (FPGA), and the like. Here, CPU is an acronym for central processing unit, and MPU is an acronym for micro processing unit. The control unit 301 can control the entire HE STA (102-104) by cooperation between a program and an OS stored in the storage unit 302 described below. Here, OS is an acronym for operating system. The control unit 301 also controls the functional unit 303 described below to perform predetermined processes, such as shooting, printing, projecting, and the like.

The storage unit 302, which includes, for example, one or both of a ROM and a RAM, stores programs for performing various operations described below, and various pieces of information, such as communication parameters for wireless communication and the like. Here, ROM is an acronym for read only memory, and RAM is an acronym for random access memory. Note that, in addition to memories, such as a ROM, RAM, and the like, the storage unit 302 may be a storage medium, such as a flexible disk, hard disk, optical disk, magneto-optical disk, CD-ROM, CD-R, magnetic tape, non-volatile memory card, DVD, or the like. The storage unit 302 includes, for example, a ROM for storing a control program that is executed by the control unit 301, and a RAM that is used as a work area which is needed to execute the control program.

The functional unit 303 is hardware for causing the HE STA (102-104) to perform a predetermined process. For example, when the HE STAs 102-104 are cameras, the functional unit 303 is an image capturing unit, and performs an image capturing process. Alternatively, for example, when the HE STAs 102-104 are printers, the functional unit 303 is a printing unit, and performs a printing process. Alternatively, for example, when the HE STAs 102-104 are projectors, the functional unit 303 is an image projecting unit, and performs an image projecting process. Data processed by the functional unit 303 may be stored in the storage unit 302 or may be exchanged with another communication apparatus through the wireless communication unit 305 described below. Note that the HE STAs 102-104 may be a printer, camera, scanner, or the like, or alternatively, a mobile apparatus, such as a smartphone or the like, or an apparatus having some function, such as a personal computer (PC), digital camera, scanner, photocopier, or the like.

The UI 304 includes an input device for receiving various operations performed by the user, such as a button or the like, and a device for outputting various pieces of information to the user, such as a liquid crystal display or a device for outputting information using voice, vibrations, or the like. Note that the UI 304 may include a device that is a single module capable of both presenting and receiving information, such as a touchscreen.

The wireless communication unit 305 controls wireless communication in accordance with at least the IEEE802.11ax standard. The wireless communication unit 305 includes, for example, a bus interface 307, a transmission buffer 308, a reception buffer 309, an MAC processing unit 310, a PHY processing unit 311, and an antenna 312.

The bus interface 307 is an interface through which data is exchanged between the internal blocks of the control unit 301 and the internal blocks of the wireless communication unit 305. For example, for radio signal transmission, the control unit 301 obtains information about the amount of free buffer space in the transmission buffer 308, and stores data to be transmitted into the transmission buffer 308, through the bus interface 307. For radio signal reception, when data is received through wireless communication and is then stored into the reception buffer 309, the bus interface 307 notifies the control unit 301 of reception interruption. The control unit 301 detects the data reception by being notified of the reception interruption, and reads the received data from the reception buffer 309 through the bus interface 307.

The MAC processing unit 310 performs data frame assembly and disassembly, and transmission/reception timing control, and the like in accordance with the IEEE802.11ax standard. In this embodiment, the MAC processing unit 310 performs virtual carrier sensing in an operation mode that is one of the one-NAV mode and the two-NAVs mode, under the control of the control unit 301. In the one-NAV mode, the MAC processing unit 310 uses a single NAV timer, and sets the NAV timer on the basis of a received frame, as in a conventional technique specified in the IEEE802.11 standards. Meanwhile, in the two-NAVs mode, the MAC processing unit 310 identifies the source BSS of a received radio frame, and on the basis of the identification result, uses two NAV timers. One of the two NAV timers is an intra-BSS NAV timer, which is updated on the basis of a frame received from an HE BSS to which the timer itself belongs. The other NAV timer is an inter-BSS NAV timer, which is updated on the basis of a frame received from the outside of the HE BSS to which the timer itself belongs. Note that, as described above, virtual carrier sensing is a technique of causing surrounding STAs to recognize the environment using RTS/CTS.

The PHY processing unit 311 includes a modulation/demodulation circuit and a radio frequency circuit that conform to the IEEE802.11a/b/g/n/ac/ax standards. The PHY processing unit 311 performs a modulation process on a data frame received from the MAC processing unit 310 in accordance with the IEEE802.11ax standard to generate a baseband signal. Thereafter, the PHY processing unit 311 converts the baseband signal into a desired frequency (radio frequency (RF)) to generate a radio signal, and transmits the radio signal through the antenna 312. The PHY processing unit 311 also frequency-converts a radio signal received through the antenna 312 into a baseband signal, performs a demodulation process on the baseband signal in accordance with the IEEE802.11a/b/g/n/ac/ax standards, and outputs the resultant signal to the MAC processing unit 310.

Figure 4:
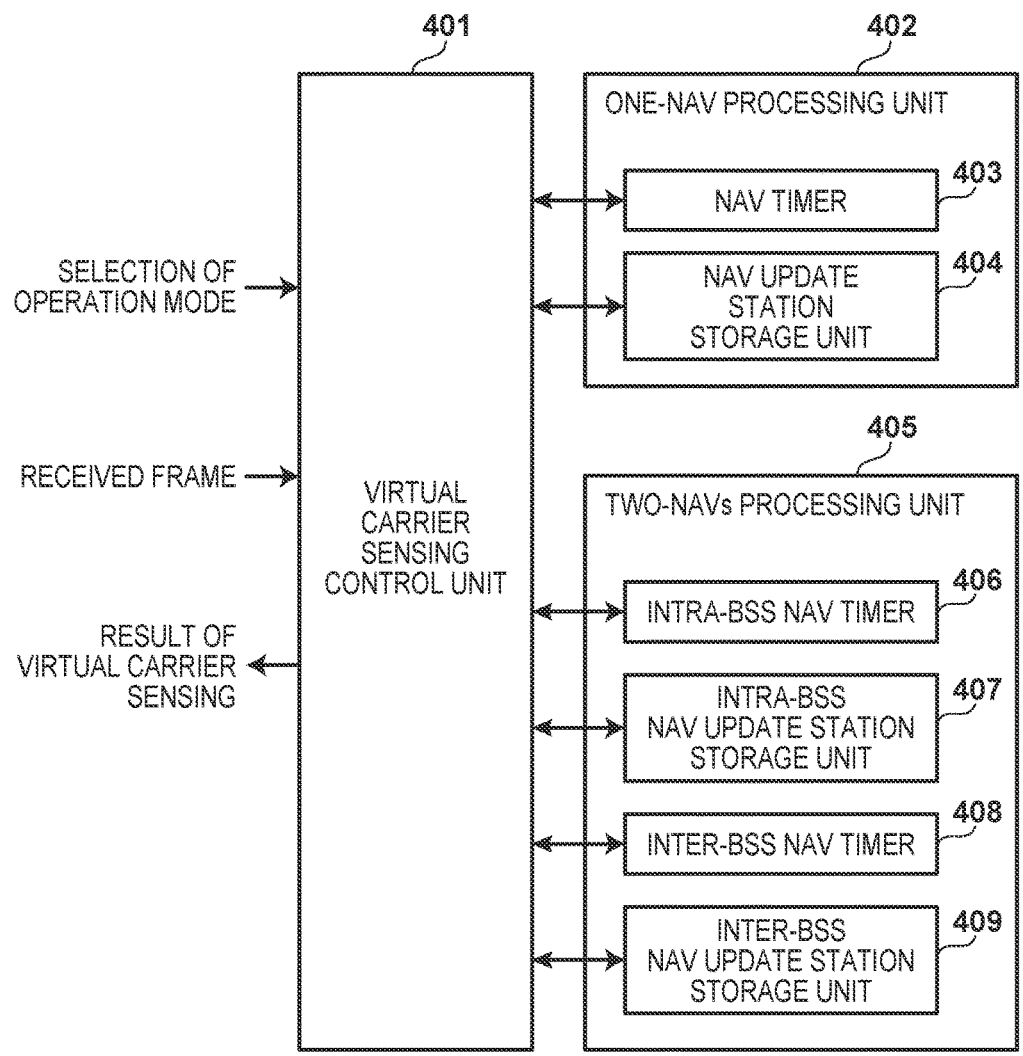
FIG. 4 is a diagram showing an example functional configuration related to virtual carrier sensing.

Next, an example functional configuration related to virtual carrier sensing performed by the MAC processing unit 310 will be described with reference to FIG. 4. The functionality of the MAC processing unit 310 related to virtual carrier sensing includes, for example, a virtual carrier sensing control unit 401, a one-NAV processing unit 402, and a two-NAVs processing unit 405.

The virtual carrier sensing control unit 401 has a function of setting a NAV timer for radio frame reception, and a function of outputting the result of virtual carrier sensing for radio frame transmission. Note that the virtual carrier sensing control unit 401 operates in one of the one-NAV mode and the two-NAVs mode, depending on operate mode selection information received from the control unit 301. The virtual carrier sensing control unit 401 activates and controls, for example, one of the one-NAV processing unit 402 and the two-NAVs processing unit 405, depending on the operation mode.

The one-NAV processing unit 402 includes a single NAV timer 403, and an NAV update station storage unit 404 for storing the source address of a radio frame that has been used to update the NAV timer 403 (i.e., information that can be used to identify an apparatus for which the NAV timer has been updated). The two-NAVs processing unit 405 includes an intra-BSS NAV timer 406, an inter-BSS NAV timer 408, an intra-BSS NAV update station storage unit 407, and an inter-BSS NAV update station storage unit 409. The NAV timers 403, 406, and 408 each include, for example, a countdown timer. The countdown timer starts counting down when the virtual carrier sensing control unit 401 sets the timer value to an NAV value corresponding to the Duration/ID field of a received frame, and stops counting down when the timer counter value is zero.

(Process Flow)

Next, a flow of the above process performed by the MAC processing unit 310 will be described.

Firstly, an example flow of an operation of the virtual carrier sensing control unit 401 to set an NAV timer for radio frame reception will be described with reference to FIG. 5. Initially, the virtual carrier sensing control unit 401 specifies an NAV value to which the NAV timer is to be set (e.g., by calculation), on the basis of a value set in the Duration/ID field of a received frame (step S501). Such a specified NAV value is referred to as an "update NAV value." The virtual carrier sensing control unit 401 confirms an operation mode designated by the control unit 301 (step S502). If the operation mode is the one-NAV mode (YES in step S502), a current timer value is read from the NAV timer 403. Note that the current timer value of the NAV timer 403 is hereinafter referred to as a "current NAV value." The current NAV value indicates the length of the NAV period remaining as a result of counting down started by the NAV timer 403 after the setting of the NAV timer 403 to the NAV value. The virtual carrier sensing control unit 401 determines whether or not the update NAV value is greater than the current NAV value (step S503). If the virtual carrier sensing control unit 401 has determined that the update NAV value is greater than the current NAV value (YES in step S503), the virtual carrier sensing control unit 401 sets the NAV timer 403 to the update NAV value, i.e., updates the timer value (step S504). In addition, the virtual carrier sensing control unit 401 stores information of a source apparatus that has transmitted the frame specifying the update NAV value, as an NAV update station, in the NAV update station storage unit 404 (step S504), and ends the process. Note that if the virtual carrier sensing control unit 401 has determined that the update NAV value is not greater than the current NAV value (NO in step S503), the virtual carrier sensing control unit 401 directly ends the process.

If the operation mode is the two-NAVs mode (NO in step S502), the virtual carrier sensing control unit 401 determines whether or not an apparatus that is a transmission source of the received radio frame belongs to the HE BSS to which the HE STA including the virtual carrier sensing control unit 401 belongs (step S505). This determination is performed on the basis of, for example, whether or not the source address field or destination address field of the received radio frame contains the MAC address of the HE AP 101.

If the virtual carrier sensing control unit 401 has determined that the source apparatus that has transmitted the received radio frame belongs to the HE BSS to which the HE STA including the virtual carrier sensing control unit 401 belongs (YES in step S505), the virtual carrier sensing control unit 401 reads a current timer value in the intra-BSS NAV timer 406. This current timer value is referred to as a "current intra-BSS NAV value." The current intra-BSS NAV value indicates the length of the intra-BSS NAV period remaining as a result of counting down started by the intra-BSS NAV timer 406 after the setting of the intra-BSS NAV timer 406 to the NAV value. Thereafter, the virtual carrier sensing control unit 401 compares the update NAV value with the current intra-BSS NAV value (step S506). If the update NAV value is greater than the current intra-BSS NAV value (YES in step S506), the virtual carrier sensing control unit 401 sets the intra-BSS NAV timer 406 to the update NAV value, i.e., updates the timer value (step S507). In addition, the virtual carrier sensing control unit 401 stores information of the source apparatus that has transmitted the frame specifying the update NAV value, as an NAV update station, in the intra-BSS NAV update station storage unit 407 (step S507), and ends the process. Meanwhile, if the virtual carrier sensing control unit 401 has determined that the update NAV value is not greater than the current intra-BSS NAV value (NO in step S506), the virtual carrier sensing control unit 401 directly ends the process.

If the virtual carrier sensing control unit 401 has determined that the source apparatus that has transmitted the received radio frame does not belong to the HE BSS to which the HE STA including the virtual carrier sensing control unit 401 belongs (NO in step S505), the virtual carrier sensing control unit 401 reads a current timer value in the inter-BSS NAV timer 408. This current timer value is referred to as a "current inter-BSS NAV value." Thereafter, the virtual carrier sensing control unit 401 compares the update NAV value with the current inter-BSS NAV value (step S508). If the update NAV value is greater than the current inter-BSS NAV value (YES in step S508), the virtual carrier sensing control unit 401 sets the inter-BSS NAV timer 408 to the update NAV value, i.e., updates the timer value (step S509). In addition, the virtual carrier sensing control unit 401 stores information of the source apparatus that has transmitted the frame specifying the update NAV value, as an NAV update station, in the inter-BSS NAV update station storage unit 409 (step S509), and ends the process. Meanwhile, if the virtual carrier sensing control unit 401 has determined that the update NAV value is not greater than the current inter-BSS NAV value (NO in step S508), the virtual carrier sensing control unit 401 directly ends the process.

Figure 6:
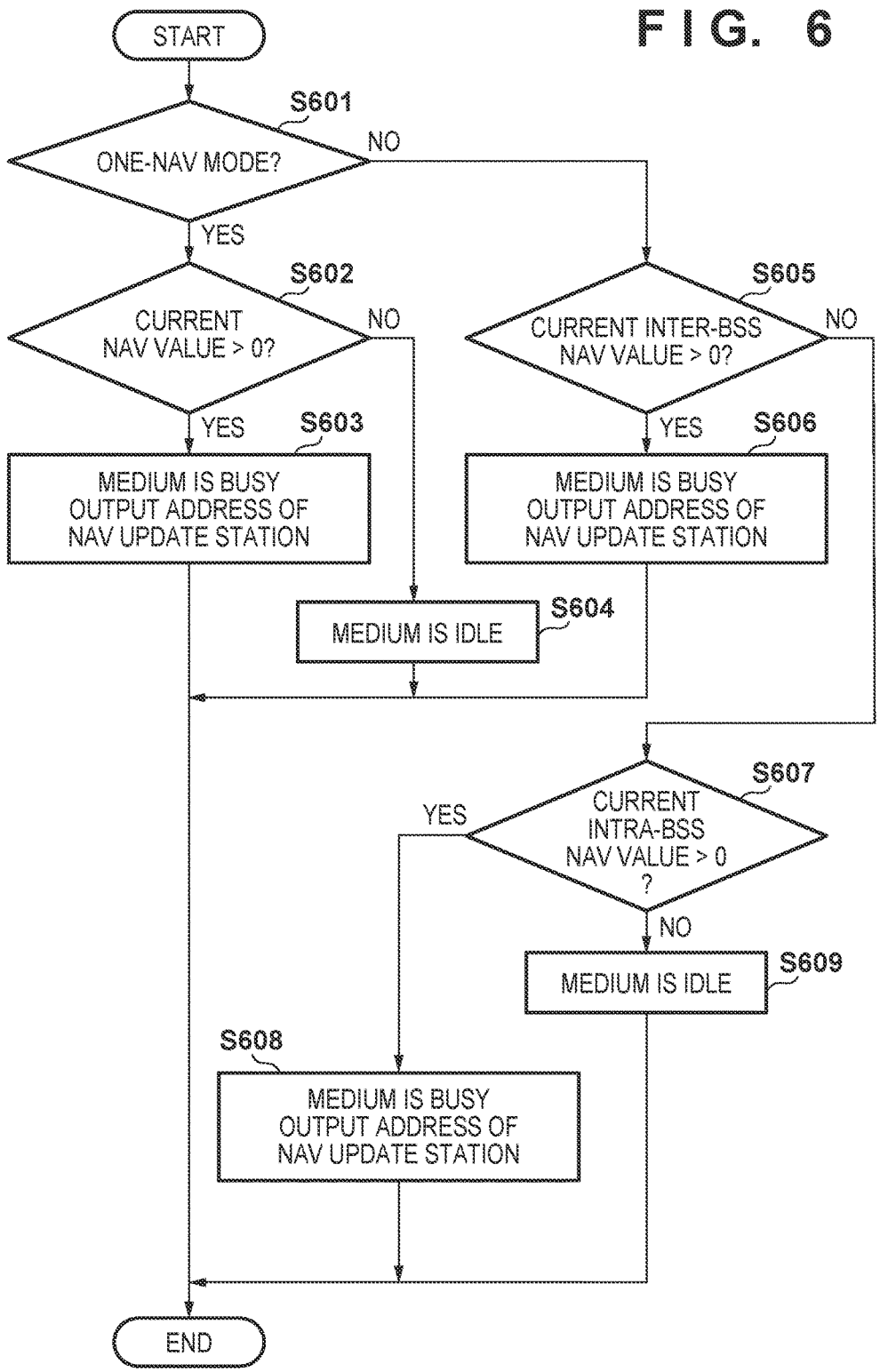
FIG. 6 is a flowchart showing an example flow of a process for radio frame transmission.

Next, a flow of the process of outputting the virtual carrier sensing result, which is performed by the virtual carrier sensing control unit 401 for radio frame transmission, will be described with reference to FIG. 6. Initially, the virtual carrier sensing control unit 401 confirms an operation mode designated by the control unit 301 (step S601). If the operation mode is the one-NAV mode (YES in step S601), the virtual carrier sensing control unit 401 determines whether or not the current NAV value is greater than zero (step S602). If the current NAV value is greater than zero (YES in step S602), the NAV has already been set, and the virtual carrier sensing control unit 401 outputs information indicating that the medium is busy (step S603). In this case, the virtual carrier sensing control unit 401 also reads address information from the NAV update station storage unit 404, outputs the address information, which is about a station for which the NAV has most recently been updated (step S603), and ends the process. If the current NAV value is zero (NO in step S602), the virtual carrier sensing control unit 401 also outputs information indicating that the medium is idle (step S604), and ends the process.

Meanwhile, if the operation mode is the two-NAVs mode (NO in step S601), the virtual carrier sensing control unit 401 determines whether or not the current inter-BSS NAV value is greater than zero (step S605). If the current inter-BSS NAV value is greater than zero (YES in step S605), the inter-BSS NAV has already been set, and the virtual carrier sensing control unit 401 outputs information indicating that the medium is busy (step S606). In this case, the virtual carrier sensing control unit 401 also reads address information from the inter-BSS NAV update station storage unit 409, outputs the address information, which is about a station for which the inter-BSS NAV has most recently been updated (step S606), and ends the process.

If the current inter-BSS NAV value is zero (NO in step S605), the virtual carrier sensing control unit 401 then determines whether or not the current intra-BSS NAV value is greater than zero (step S607). If the current intra-BSS NAV value is greater than zero (YES in step S607), the intra-BSS NAV has already been set, and the virtual carrier sensing control unit 401 outputs information indicating that the medium is busy (step S608). In this case, the virtual carrier sensing control unit 401 also reads address information from the intra-BSS NAV update station storage unit 407, outputs the address information, which is about a station for which the intra-BSS NAV has most recently been updated (step S608), and ends the process. If the current intra-BSS NAV value is zero (NO in step S607), the virtual carrier sensing control unit 401 outputs information indicating that the medium is idle (step S609), and ends the process.

The MAC processing unit 310, when receiving an MU RTS frame and a trigger frame, decides whether or not to respond to the trigger frame, on the basis of the above information output by the virtual carrier sensing control unit 401. For example, the MAC processing unit 310, when receiving an MU RTS frame and a trigger frame, responds to these frames, only if the medium is busy and the NAV update station is the HE AP 101.

Figure 7:
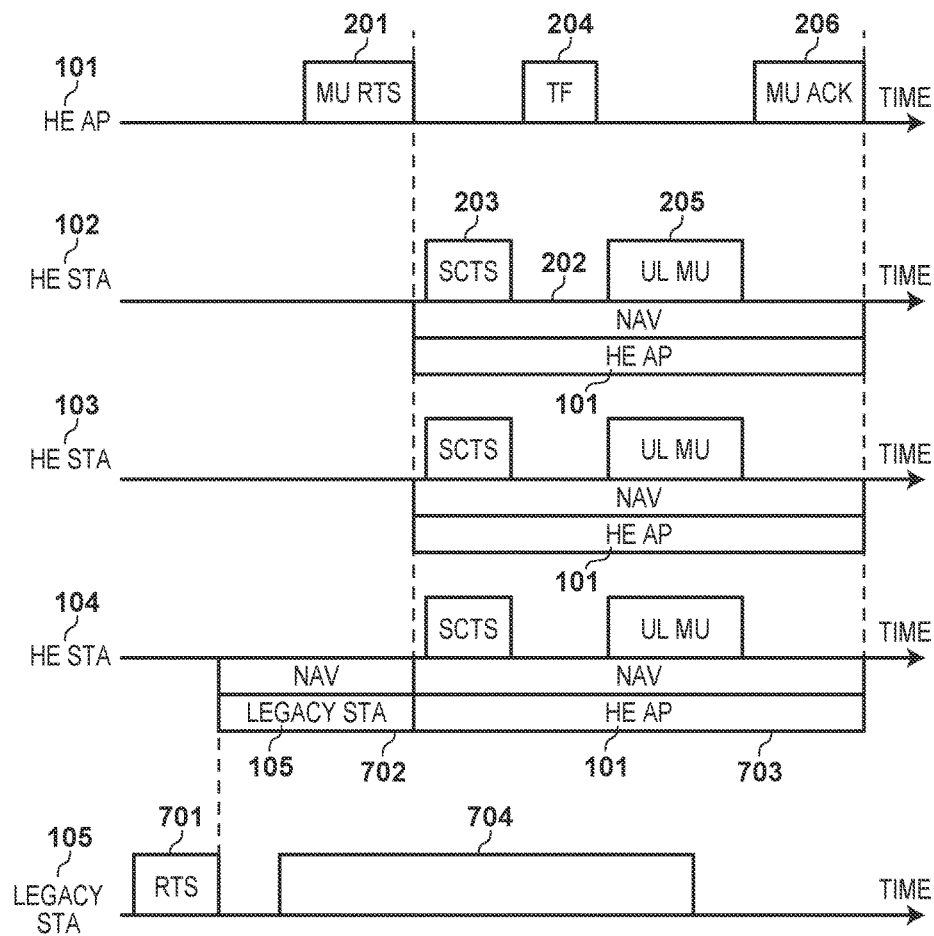
FIG. 7 is a diagram showing an example operation for UL MU communication in a one-NAV mode.
Figure 8:
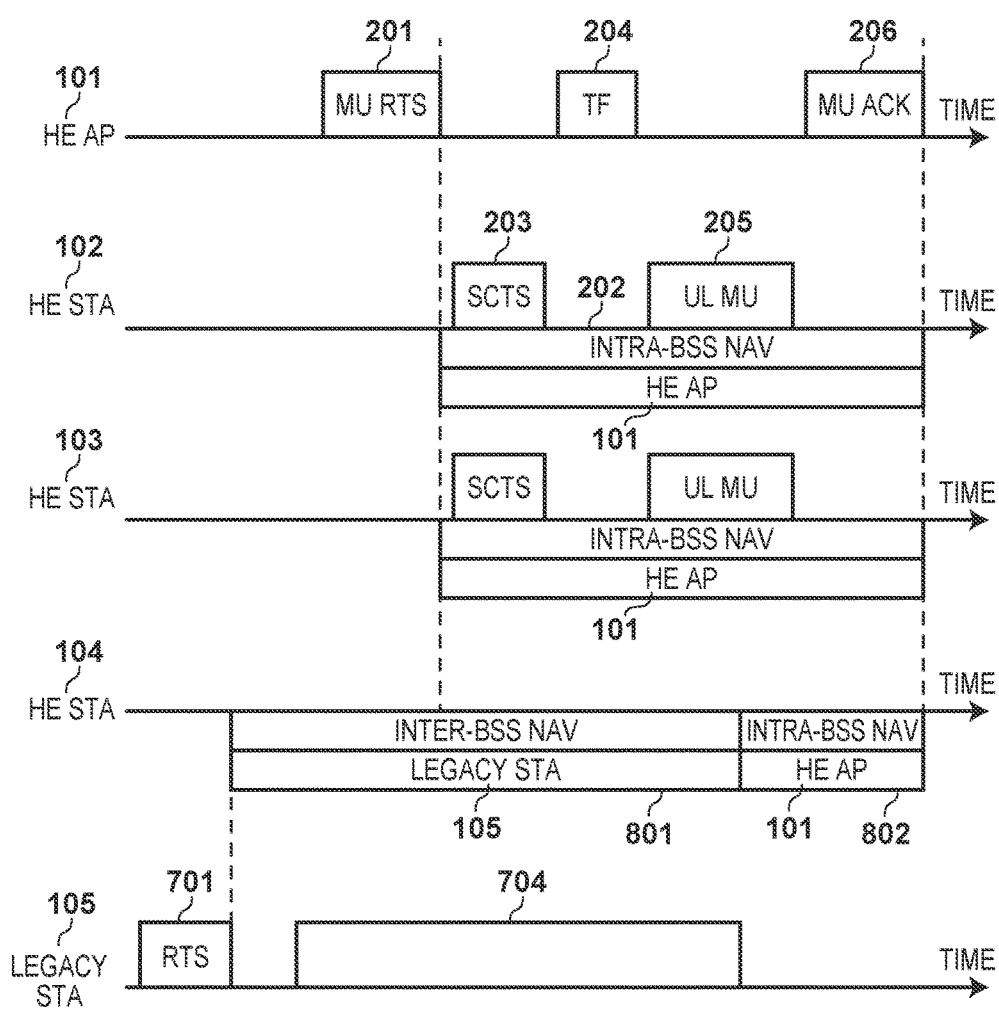
FIG. 8 is a diagram showing an example operation for UL MU communication in a two-NAVs mode.

Next, example operations will be described which are performed by the HE STA 104 in the one-NAV mode and the two-NAVs mode when the NAV is set on the basis of a frame transmitted from the legacy STA 105 before MU RTS is received from the HE AP 101. FIG. 7 is a diagram showing an example operation for UL MU communication in the one-NAV mode. FIG. 8 is a diagram showing an example operation for UL MU communication in the two-NAVs mode. Note that portions of FIGS. 7 and 8 similar to portions of FIG. 2 will not be described.

In FIG. 7, the HE STA 104 receives an RTS frame 701 transmitted from the legacy STA 105. In this case, the HE STA 104 sets a timer value (NAV 702) on the basis of the RTS frame 701, and stores information of the legacy STA 105 as an update station for the NAV 702. Thereafter, when the HE STA 104 receives an MU RTS frame 201, then if an update NAV value based on the MU RTS frame 201 is greater than the current NAV value, the HE STA 104 updates the timer value with the update NAV value, and also updates the update station information. In this example, it is assumed that the update NAV value is greater than the current NAV value. In this case, the HE STA 104 updates the timer value (NAV 703), and stores information of the HE AP 101 as an update station for the NAV 703 (step S504 in FIG. 5).

If the HE STA 104 receives an MU RTS frame 201 and a basic trigger frame 204, the HE STA 104 responds using an SCTS frame and a UL MU frame, because the medium is busy and the update station for the NAV 703 is the HE AP 101. In this case, the transmission of a data frame 704 by the legacy STA 105 and the transmission of an SCTS frame and a UL MU frame by the HE STA 104 are performed in parallel, and therefore, interference may occur. Note that the HE AP 101 is located outside the signal transmission coverage range of the legacy STA 105, and therefore, the influence of the interference operation on the signal reception operation of the HE AP 101 is reduced to a sufficiently low level. Meanwhile, if a station that is a destination of the data frame 704 of the legacy STA 105 is located within the signal transmission coverage range of the HE STA 104, interference occurs in the destination station, leading to a deterioration in reception quality.

Figure 5:
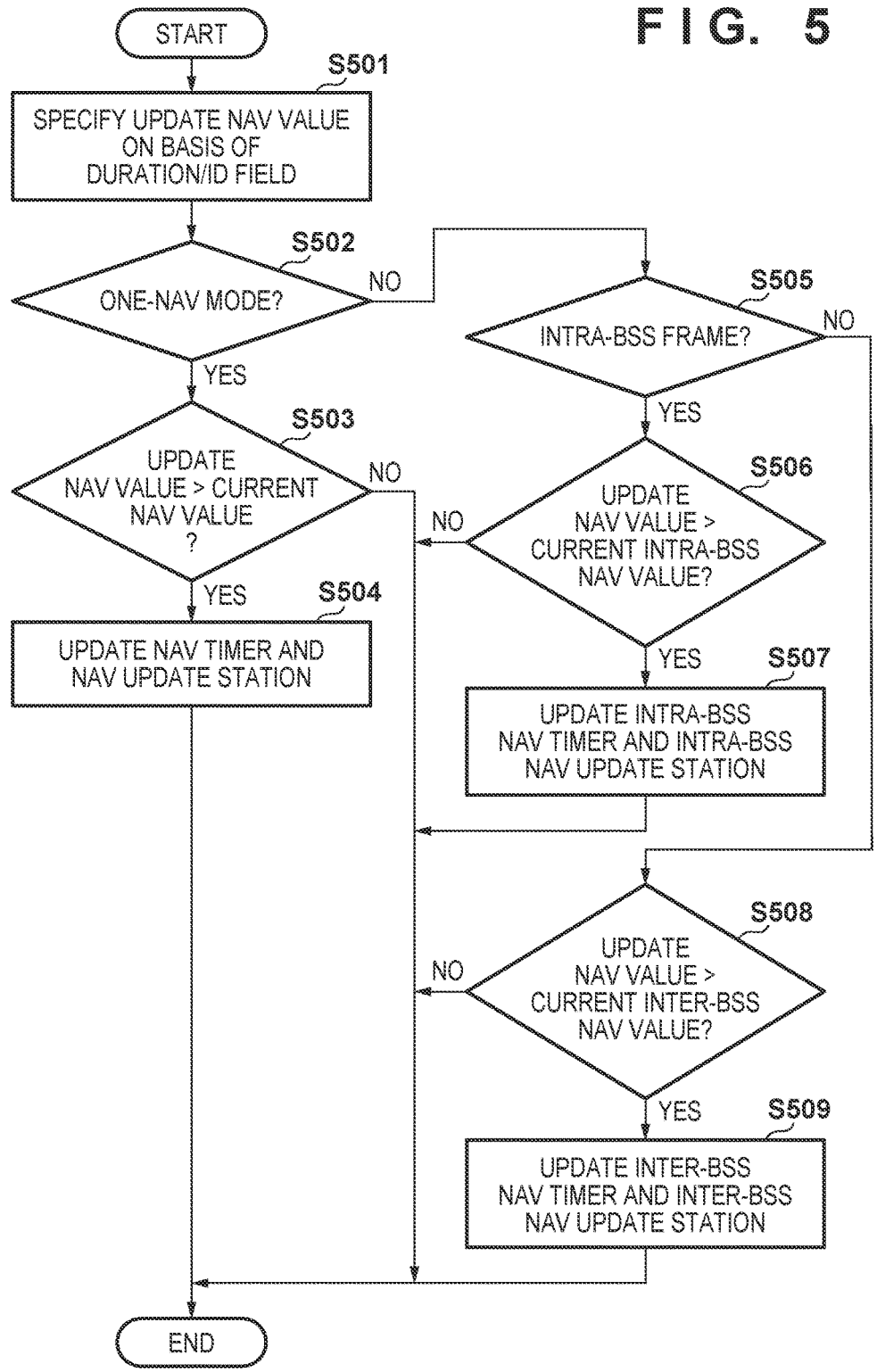
FIG. 5 is a flowchart showing an example flow of a process for radio frame reception.

In FIG. 8, the HE STA 104 sets an inter-BSS NAV 801 on the basis of an RTS frame 701 transmitted from the legacy STA 105, and stores information of the legacy STA 105 as an update station for the inter-BSS NAV 801 (step S507 in FIG. 5). Thereafter, the HE STA 104, when receiving an MU RTS frame 201, sets an intra-BSS NAV timer 406, and stores information of the HE AP 101 as an update station for the intra-BSS NAV (step S509 in FIG. 5). Note that, in this case, the inter-BSS NAV 801 is referenced (steps S605 and S606 in FIG. 6), and an intra-BSS NAV 802 is not referenced, until the inter-BSS NAV timer 408 ends counting down. During a period of time when the inter-BSS NAV 801 is effective, the medium is busy, but the NAV update station is not the HE AP 101. Therefore, even when the HE STA 104 receives an MU RTS frame 201 and a basic trigger frame 204 during this period of time, the HE STA 104 does not respond. The HE STA 104 references the intra-BSS NAV 802 after the inter-BSS NAV 801 ends (steps S607-S609 in FIG. 6). Therefore, when the HE STA 104 receives an MU RTS frame and a basic trigger frame during a period of time when the intra-BSS NAV 802 is referenced, the HE STA 104 responds to these frames using an SCTS frame and an UL MU frame. In the two-NAVs mode, this operation can prevent or reduce interference with a signal transmitted in another BSS.

As described above, in the one-NAV mode, even when an NAV is set using a frame from another BSS, UL MU communication may be performed during the NAV period. Meanwhile, in the two-NAVs mode, when an NAV is set using a frame from another BSS, UL MU communication is not performed during the NAV period. In other words, an HE STA gives priority to the spatial frequency utilization efficiency of IEEE802.11ax when operating in the one-NAV mode, and to the avoidance of interference with another BSS when operating in the two-NAVs mode. In this embodiment, the control unit 301 of each of the HE STAs 102-104 switches between the two operation modes and operates in the selected mode, and therefore, can both improve frequency utilization efficiency by the use of IEEE802.11ax, and prevent or reduce interference with another BSS.

Figure 9:
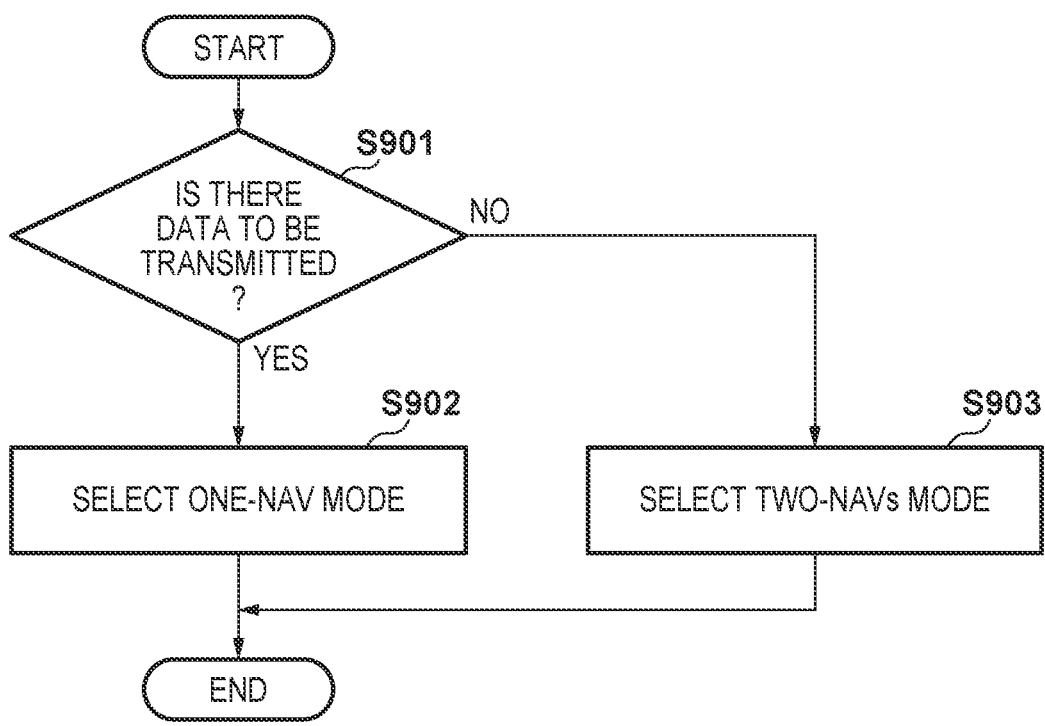
FIG. 9 is a flowchart showing an example process of selecting an operation mode.

Next, a flow of the operation mode selection process performed by the control unit 301 will be described with reference to FIG. 9. Initially, the control unit 301 determines whether or not there is data to be transmitted to the HE AP 101 (step S901). If the control unit 301 has determined that there is data to be transmitted (YES in step S901), the control unit 301 selects the one-NAV mode (step S902). Otherwise (NO in step S901), the control unit 301 selects the two-NAVs mode (step S903). As a result, when there is not data to be transmitted, the HE STA operates in the two-NAVs mode, and while an NAV is set for another BSS, does not transmit an SCTS frame or a UL MU frame and thereby prevents or reduces interference with that BSS. Meanwhile, when there is data to be transmitted, the HE STA operates in the one-NAV mode, and gives priority operation conforming to IEEE802.11ax and thereby improves frequency utilization efficiency.

Although, in this embodiment, the control unit 301 selects an operation mode on the basis of whether or not there is data to be transmitted to the HE AP 101, the present invention is not limited to this. For example, the control unit 301 may select an operation mode on the basis of an amount of data items buffered in the transmission buffer 308. For example, the control unit 301 selects the one-NAV mode to give priority to ensuring of signal transmission opportunities when the amount of data items buffered in the transmission buffer 308 is greater than or equal to a predetermined threshold, and selects the two-NAVs mode to give priority to prevention or reduction of interference with a signal from another BSS when the amount of data items buffered in the transmission buffer 308 is smaller than the predetermined threshold. Here, if the threshold is set to low, the one-NAV mode is more likely to be selected. Conversely, if the threshold is set to high, the two-NAVs mode is more likely to be selected. Therefore, by appropriately setting the threshold, it can be decided whether priority should be given to frequency utilization efficiency or avoidance of interference with another BSS, depending on the situation.

Alternatively, the control unit 301 may select an operation mode on the basis of the received signal strength indicator (RSSI) of a signal from another BSS. If the RSSI of a signal from another BSS is small, a communication apparatus belonging to that BSS may be distant, and therefore, even when an HE STA transmits a signal, the signal may be less likely to interfere with a signal communicated by the BSS. Therefore, for example, the control unit 301 selects the one-NAV mode when the RSSI of a signal from another BSS is smaller than a predetermined value. Meanwhile, the control unit 301 selects the two-NAVs mode when the RSSI of a signal from another BSS is greater than or equal to the predetermined value. As a result, the control unit 301 can prevent or reduce interference with another BSS while improving frequency utilization efficiency, depending on the surrounding environment. Note that, for example, the HE STAs 102-104 may operate in the one-NAV mode when there is a signal to be transmitted, or when the amount of data held in the buffer is greater than or equal to a predetermined value and the RSSI is small. Thus, the operation modes may be selected using a plurality of criteria in combination.

Alternatively, the control unit 301 may perform the selection such that the one-NAV mode and the two-NAVs mode is (for example alternately) switched in a time-division manner. The period ratio of the modes may, for example, be set on the basis of a signal received from another BSS. For example, the control unit 301 increases the fraction of the period during which the one-NAV mode is selected when a wireless scheme used in another BSS has a lower frequency utilization efficiency than that of IEEE802.11ax. Meanwhile, the control unit 301 increases the fraction of the period during which the two-NAVs mode is selected when a wireless scheme used in another BSS has a higher frequency utilization efficiency than that of IEEE802.11ax. The comparison of frequency utilization efficiency may be performed by comparing a BSS to which the control unit 301 belongs with another BSS in terms of, for example, effective communication speed that is calculated from a modulation scheme and an encoding scheme, etc., for a radio signal. As a result, the control unit 301 can set the period ratio of the operation modes, taking into consideration the frequency utilization efficiency of another BSS. Note that, instead of switching between the one-NAV mode and the two-NAVs mode in a time-division manner, the control unit 301 may decide to use one of the two operation modes over all period, depending on frequency utilization efficiency.

Although, in the foregoing, the communication process performed by the HE STAs 102-104 in accordance with IEEE802.11ax has been described, the above discussion may be applied to communication apparatuses that do not conform to IEEE802.11ax.

For example, the above HE STAs may each be replaced with any communication apparatus that decides whether to manage one of a first period set for a first group to which the apparatus itself belongs and a second period set for a second group to which the apparatus itself does not belong, or manage both of the first and second periods. In other words, this communication apparatus does not necessarily need to be an STA, and may be an AP that performs the above processes, for example. Also, as an example, in a first operation mode in which one of the first and second periods is managed, this communication apparatus specifies whether the managed period is the first period or the second period. This specification is, for example, performed by managing the address of a source apparatus that has most recently transmitted a predetermined signal, such as an RTS or the like, that triggers start of a period. The communication apparatus is allowed to transmit a signal only during the first period, and is not allowed to transmit a signal during the second period. Meanwhile, in a second operation mode in which both of the first and second periods are managed, the communication apparatus is not allowed to transmit a signal during the second period even when it is during the first period, and is allowed to transmit a signal during the first period excluding the second period. Note that the communication apparatus may transmit a signal as a response when receiving a predetermined signal from the other end of communication during the first period. Thus, the technique of this embodiment is not only applied to IEEE802.11ax, but also is widely applied to any communication apparatuses such as those described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-183360, filed Sep. 20, 2016, which is hereby incorporated by reference herein in its entirety.

What is claimed is:

1. A communication apparatus comprising:
one or more processors; and
one or more memories storing instructions that, when executed by the one or more processors, cause the communication apparatus to:
select first mode or a second mode based on whether to transmit stored data to another apparatus belonging to a first Basic Service Set (BSS) complying with IEEE802.11 standard to which the communication apparatus belongs, wherein a first Network Allocation Vector (NAV) and a second NAV are maintained in the first mode, and wherein one of the first NAV and the second NAV is maintained in the second mode;
in a case where the first mode is selected:
update the first NAV based on a received signal, in a case where the received signal is received from another apparatus that belongs to the first BSS and where a length of a period of a NAV specified in the received signal is longer than a length of a remaining period of the first NAV before being updated; and
update the second NAV based on a received signal, in a case where the received signal is received from another apparatus that is outside of the first BSS and where a length of a period of a NAV specified in the received signal is longer than a length of a remaining period of the second NAV before being updated;
in a case where the second mode is selected:
update the NAV which is currently maintained based on a received signal in a case where a length of period of a NAV specified in the received signal is longer than a remaining period of the currently-maintained NAV before being updated, regardless of whether the received signal is received from the another apparatus that belongs to the first BSS or from the another apparatus that is outside of the first BSS; and
when the first mode is selected:
in a case where the first NAV is not zero and the second NAV is zero and a Trigger Frame (TF) complying with IEEE802.11ax standard is received, make a response to the TF; and
in a case where the second NAV is not zero and the TF is received, not make a response to the TF.

2. The communication apparatus according to claim 1, wherein
the TF is transmitted from another communication apparatus belonging to the first BSS.

3. The communication apparatus according to claim 1, wherein
the communication apparatus performs the selection such that the first mode and the second mode are switched in a time-division manner.

4. The communication apparatus according to claim 3, wherein
a period ratio of the first mode and the second mode is determined on the basis of frequency utilization efficiency in the first BSS and frequency utilization efficiency in another BSS.

5. The communication apparatus according to claim 1, wherein
the communication apparatus performs communication in accordance with the IEEE802.11ax standard.

6. The communication apparatus according to claim 1, wherein
the communication apparatus is a station configured to communicate with an access point belonging to the first BSS.

7. The communication apparatus according to claim 1, wherein, in a case where the second mode is selected, the communication apparatus makes a response to the TF in a case where the TF is received even if the currently-maintained NAV is not zero.

8. The communication apparatus according to claim 1, wherein,
in a case where the second mode is selected, the communication apparatus stores a source address of signal which updated the currently-maintained NAV.

9. The communication apparatus according to claim 1, wherein
in a case where the second mode is selected, the communication apparatus maintains the first NAV and does not maintain the second NAV.

10. A method of controlling a communication, comprising:
selecting a first mode or a second mode based on whether to transmit stored data to another apparatus belonging to a first Basic Service Set (BSS) complying with IEEE802.11 standard to which the communication apparatus belongs, wherein a first Network Allocation Vector (NAV) and a second NAV are maintained in the first mode, and wherein one of the first NAV and the second NAV is maintained in the second mode;
in a case where the first mode is selected:
updating the first NAV based on a received signal, in a case where the received signal is received from another apparatus that belongs to the first BSS and where a length of a period of a NAV specified in the received signal is longer than a length of a remaining period of the first NAV before being updated; and
updating the second NAV based on a received signal, in a case where the received signal is received from another apparatus that is outside of the first BSS and where a length of a period of a NAV specified in the received signal is longer than a length of a remaining period of the second NAV before being updated;
in a case where the second mode is selected:
updating the NAV which is currently maintained based on a received signal in a case where a length of a period of a NAV specified in the received signal is longer than a length of a remaining period of the currently-maintained NAV before being updated, regardless of whether the received signal is received from the another apparatus that belongs to the first BSS or from the another apparatus that is outside of the first BSS; and
when the first mode is selected:
in a case where the first NAV is not zero and the second NAV is zero and a Trigger Frame (TF) complying with IEEE802.11ax standard is received, making a response to the TF; and in a case where the second NAV is not zero and the TF is received, not making a response to the TF.

11. A non-transitory computer-readable storage medium storing a computer program for causing a computer included in a communication apparatus to execute a method of communicating, the method comprising:

selecting a first mode or a second mode based on whether to transmit stored data to another apparatus belonging to a first Basic Service Set (BSS) complying with IEEE802.11 standard to which the communication apparatus belongs, wherein a first Network Allocation Vector (NAV) and a second NAV are maintained in the first mode, and wherein one of the first NAV and the second NAV is maintained in the second mode;

in a case where the first mode is selected:
  updating the first NAV based on a received signal, in a case where the received signal is received from another apparatus that belongs to the first BSS and where a length of a period of a NAV specified in the received signal is longer than a length of a remaining period of the first NAV before being updated; and
  updating the second NAV based on a received signal, in a case where the received signal is received from another apparatus that is outside of the first BSS and where a length of a period of a NAV specified in the received signal is longer than a length of a remaining period of the second NAV before being updated;

in a case where the second mode is selected:
  updating the NAV which is currently maintained based on a received signal in a case where a length of a period of a NAV specified in the received signal is longer than a length of a remaining period of the currently-maintained NAV before being updated, regardless of whether the received signal is received from the another apparatus that belongs to the first BSS or from the another apparatus that is outside of the first BSS; and when the first mode is selected:
  in a case where the first NAV is not zero and the second NAV is zero and when a Trigger Frame (TF) complying with IEEE802.11ax standard is received, making a response to the TF; and
  in a case where the second NAV is not zero and the TF is received, not making a response to the TF.

* * * * *